US011150548B2

(12) United States Patent
Suzuki et al.

(10) Patent No.: US 11,150,548 B2
(45) Date of Patent: Oct. 19, 2021

(54) LIGHT SOURCE APPARATUS AND PROJECTOR

(71) Applicant: SEIKO EPSON CORPORATION, Tokyo (JP)

(72) Inventors: Junichi Suzuki, Matsumoto (JP); Hidefumi Sakata, Kamiina-gun (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/549,265

(22) Filed: Aug. 23, 2019

(65) Prior Publication Data

US 2020/0064722 A1 Feb. 27, 2020

(30) Foreign Application Priority Data

Aug. 24, 2018 (JP) .............................. JP2018-157169

(51) Int. Cl.
*G03B 21/20* (2006.01)
(52) U.S. Cl.
CPC ....... *G03B 21/204* (2013.01); *G03B 21/2066* (2013.01)
(58) Field of Classification Search
CPC .......... G03B 21/20–2086; F21V 33/12; G02B 6/0003; G02B 6/0068; G02B 27/0994
See application file for complete search history.

(56) References Cited

U.S. PATENT DOCUMENTS

| 2009/0078949 | A1 | 3/2009 | Bechtel et al. |
| 2016/0131813 | A1 | 5/2016 | Hikmet et al. |
| 2016/0266297 | A1 | 9/2016 | Hikmet et al. |
| 2017/0315433 | A1 | 11/2017 | Ronda et al. |
| 2020/0033707 | A1* | 1/2020 | Sakata ................ H04N 9/3152 |
| 2020/0166828 | A1* | 5/2020 | Sakata ................ G02B 6/0008 |

FOREIGN PATENT DOCUMENTS

| JP | 2017009981 A | * | 1/2017 |
| JP | 2017-536664 A | | 12/2017 |
| WO | 2006/054203 A1 | | 5/2006 |
| WO | WO-2017067781 A1 | * | 4/2017 | .......... G02B 6/0003 |

* cited by examiner

*Primary Examiner* — Mariceli Santiago
(74) *Attorney, Agent, or Firm* — Dority & Manning, P.A.

(57) ABSTRACT

A light source apparatus according to an aspect includes a light source that outputs first light and second light, wavelength converter that contains phosphor and converts first light into fluorescence, and a light combiner that combines second light with fluorescence and outputs the resultant combined light. Wavelength converter has a first end surface and a second end surface and a side surface. Light combiner has a first surface and a second surface and a third surface. First end surface of the wavelength converter faces the first surface of the light combiner. First light enters the wavelength converter via the side surface, and the fluorescence exits out of the wavelength converter via the first end surface. Fluorescence enters the light combiner via the first surface, the second light enters the light combiner via the third surface, and the combined light exits out of the light combiner via the second surface.

10 Claims, 5 Drawing Sheets

LIGHT SOURCE APPARATUS AND PROJECTOR

The present application is based on, and claims priority from JP Application Serial Number 2018-157169, filed Aug. 24, 2018, the disclosure of which is hereby incorporated by reference herein in its entirety.

BACKGROUND

1. Technical Field

The present disclosure relates to a light source apparatus and a projector.

2. Related Art

As a light source apparatus used in a projector, there is a proposed light source apparatus using fluorescence emitted from a phosphor irradiated with excitation light outputted from a light emitter. JP-T-2017-536664 discloses an illuminator including a rod-shaped ceramic element that provides a wavelength conversion effect and a light emitting diode (LED) that outputs excitation light and having a configuration in which the excitation light enters the ceramic element via a side surface thereof and the resultant converted light is extracted from the ceramic element via an end surface thereof.

As described in JP-T-2017-536664, causing the light outputted from the LED to enter the wavelength conversion member allows generation of light having a wavelength different from the wavelength of the light outputted from the LED. For example, in a case where the wavelength conversion member contains a yellow phosphor, blue light outputted from the LED can generate yellow light. To generate white light necessary for a light source apparatus for a projector, however, a light source that outputs blue light, a light combiner that combined the blue light and the yellow light with each other, and other optical systems need to be provided separately from the illuminator disclosed in JP-T-2017-536664, resulting in a problem of an increase in the size of the light source apparatus. Further, to generate color light other than white light, an optical system for combining the fluorescence with other color light also causes the problem of an increase in the size of the light source apparatus.

SUMMARY

A light source apparatus according to an aspect of the present disclosure includes a light source that outputs first light and second light, a wavelength converter that at least contains a phosphor and converts the first light outputted from the light source into fluorescence having a wavelength band different from a wavelength band of the first light, and a light combiner that combines the second light outputted from the light source with the fluorescence having exited out of the wavelength converter and outputs a resultant combined light. The wavelength converter has a first end surface and a second end surface that face each other and a side surface that intersects the first and second end surfaces. The light combiner has a first surface and a second surface that face each other and a third surface that intersects the first and second surfaces. The first end surface of the wavelength converter faces the first surface of the light combiner. The first light enters the wavelength converter via the side surface, and the fluorescence exits out of the wavelength converter via the first end surface. The fluorescence enters the light combiner via the first surface, the second light enters the light combiner via the third surface, and the combined light exits out of the light combiner via the second surface.

In the light source apparatus according to the aspect of the present disclosure, the wavelength band of the first light may be the same as a wavelength band of the second light.

In the light source apparatus according to the aspect of the present disclosure, the light combiner may contain scatterers that scatter the second light and the fluorescence.

In the light source apparatus according to the aspect of the present disclosure, the scatterers may have scattering anisotropy characterized in that the scatterers scatter light in a direction that intersects the first and surfaces by a greater amount than in a direction parallel to the first and second surfaces.

In the light source apparatus according to the aspect of the present disclosure, the light combiner may include a dichroic prism that transmits the fluorescence and reflects the second light.

The light source apparatus according to the aspect of the present disclosure may further include a reflector that is provided at the second end surface of the wavelength converter and reflects at least the fluorescence.

The light source apparatus according to the aspect of the present disclosure may further include an angle converter that is provided at a light exiting side of the light combiner, has a light incident end surface and a light exiting end surface, and causes a diffusion angle of the combined light at the light exiting end surface to be smaller than the diffusion angle of the combined light at the light incident end surface.

In the light source apparatus according to the aspect of the present disclosure, a wavelength band of the second light may be a blue wavelength band, and the wavelength band of the fluorescence may be a yellow wavelength band.

A projector according to another aspect of the present disclosure includes the light source apparatus according to the aspect of the present disclosure, a light modulator that modulates light from the light source apparatus in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 and 2.

A projector according to the present embodiment is an example of a projector using a liquid crystal panel as a light modulator.

In the following drawings, components are drawn at different dimensional scales in some cases for clarity of each of the components.

A projector 1 according to the present embodiment is a projection-type image display apparatus that displays a color image on a screen (projection surface) SCR. The projector 1 uses three light modulators corresponding to the following color light: red light LR; green light LG; and blue light LB.

Figure 1:
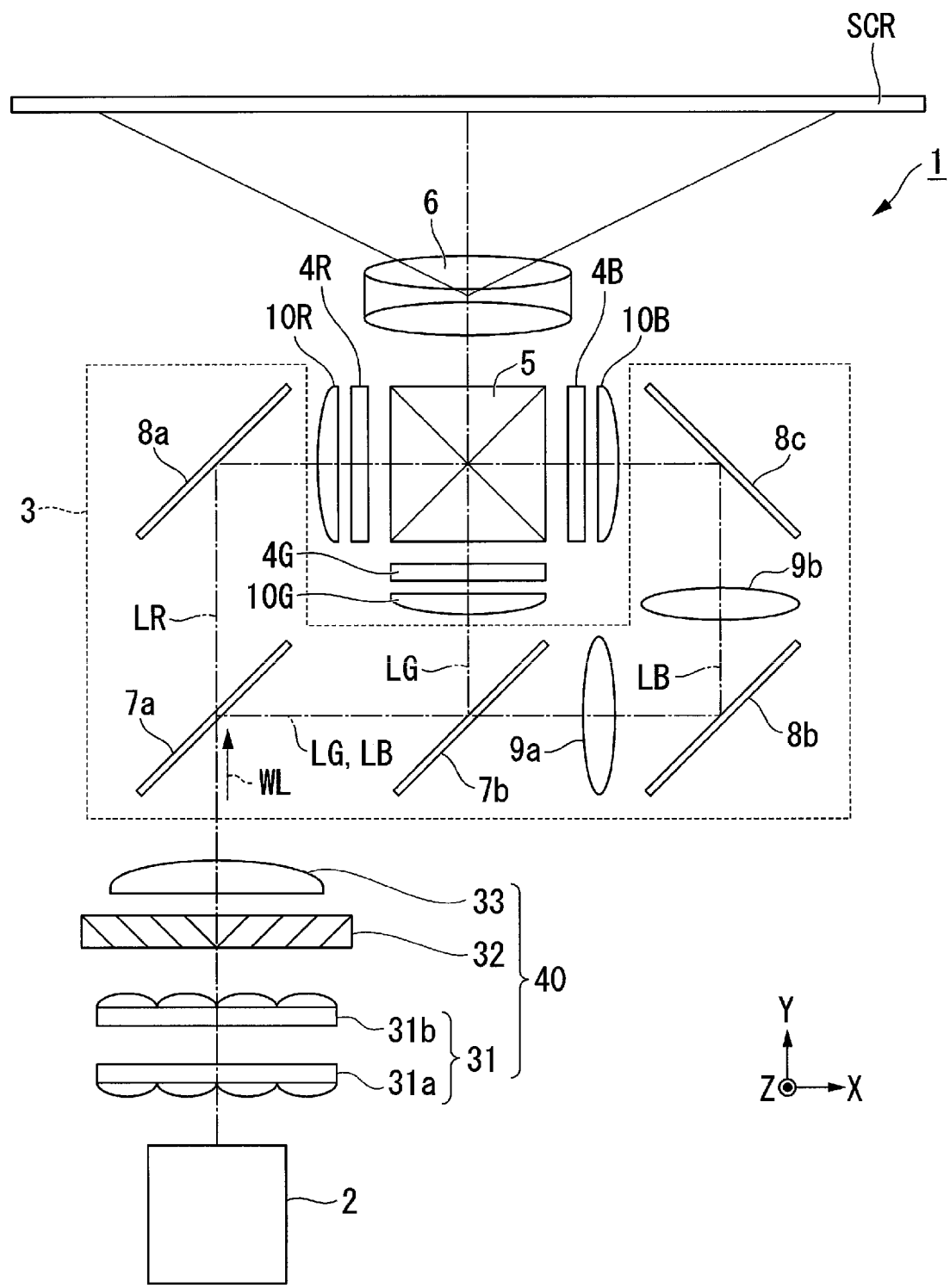
FIG. 1 is a schematic configuration diagram of a projector according to a first embodiment.

The projector 1 includes a light source apparatus 2, a uniform illumination system. 40, a color separation system 3, a light modulator 4R, a light modulator 4G, and a light modulator 4B, a light combining system 5, and a projection optical apparatus 6, as shown in FIG. 1.

The light source apparatus 2 outputs illumination light WL toward the uniform illumination system 40. The detailed configuration of the light source apparatus 2 will be described later in detail.

The uniform illumination system 40 includes an optical integration system 31, a polarization converter 32, and a superimposing system 33. The optical integration system 31 includes a first lens array 31a and a second lens array 31b. The uniform illumination system 40 homogenizes the intensity distribution of the illumination light WL, which is outputted from the light source apparatus 2, in each of the light modulators 4R, 4G, and 4B, which are each a region to be illuminated. The illumination light WL having exited out of the uniform illumination system 40 enters the color separation system 3.

The color separation system 3 separates the illumination light WL, which is white light, into the red light LR, the green light LG, and the blue light LB. The color separation system 3 includes a first dichroic mirror 7a, a second dichroic mirror 7b, a first reflection mirror 8a, a second reflection mirror 8b, a third reflection mirror 8c, a first relay lens 9a and a second relay lens 9b.

The first dichroic mirror 7a separates the illumination light WL from the light source apparatus 2 into the red light LR and the other light (green light LG and blue light LB). The first dichroic mirror 7a transmits the separated red light LR and reflects the other light (green light LG and blue light LB). On the other hand, the second dichroic mirror 7b separates the other light into the green light LG and the blue light LB. The second dichroic mirror 7b reflects the separated green light LG and transmits the blue light LB.

The reflection mirror 8a is disposed in the optical path of the red light LR and reflects the red light LR having passed through the first dichroic mirror 7a toward the light modulator 4R. On the other hand, the second reflection mirror 8b and the third reflection mirror 8c are disposed in the optical path of the blue light LB and reflect the blue light LB having passed through the second dichroic mirror 7b toward the light modulator 4B. The green light LG is reflected off the second dichroic mirror 7b toward the light modulator 4G.

The first relay lens 9a and the second relay lens 9b are disposed in the optical path of the blue light LB on the light exiting side of the second dichroic mirror 7b. The first relay lens 9a and the second relay lens 9b correct the difference in illumination distribution of the blue light LB resulting from the fact that the optical path of the blue light LB is longer than the optical paths of the red light LR and the green light LG.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each formed, for example, of a transmissive liquid crystal panel. Polarizers (not shown) are disposed on the light incident side and the light exiting side of each of the liquid crystal panels and each transmit only light linearly polarized in a specific direction.

Field lenses 10R, 10G, and 10G are disposed on the light incident side of the light modulators 4R, 4G, and 4B, respectively. The field lenses 10R, 10G, and 10B parallelize the chief rays of the red light LR, the green light LG, and the blue light LB to be incident on the light modulators 4R, 4G, and 4B, respectively.

The light combining system 5 receives the incident image light outputted from each of the light modulators 4R, 4G, and 4B, combines the image light corresponding to the red light LR, the image light corresponding to the green light LG, and the image light corresponding to the blue light LB with one another, and causes the combined image light to exit toward the projection optical apparatus 6. The light combining system 5 is formed, for example, of a cross dichroic prism.

The projection optical apparatus 6 is formed of a plurality of projection lenses. The projection optical apparatus 6 enlarges the combined image light from the light combining systems 5 and projects the enlarged image light toward the screen SCR. An image is thus displayed on the screen SCR.

The light source apparatus 2 will be described below.

Figure 2:
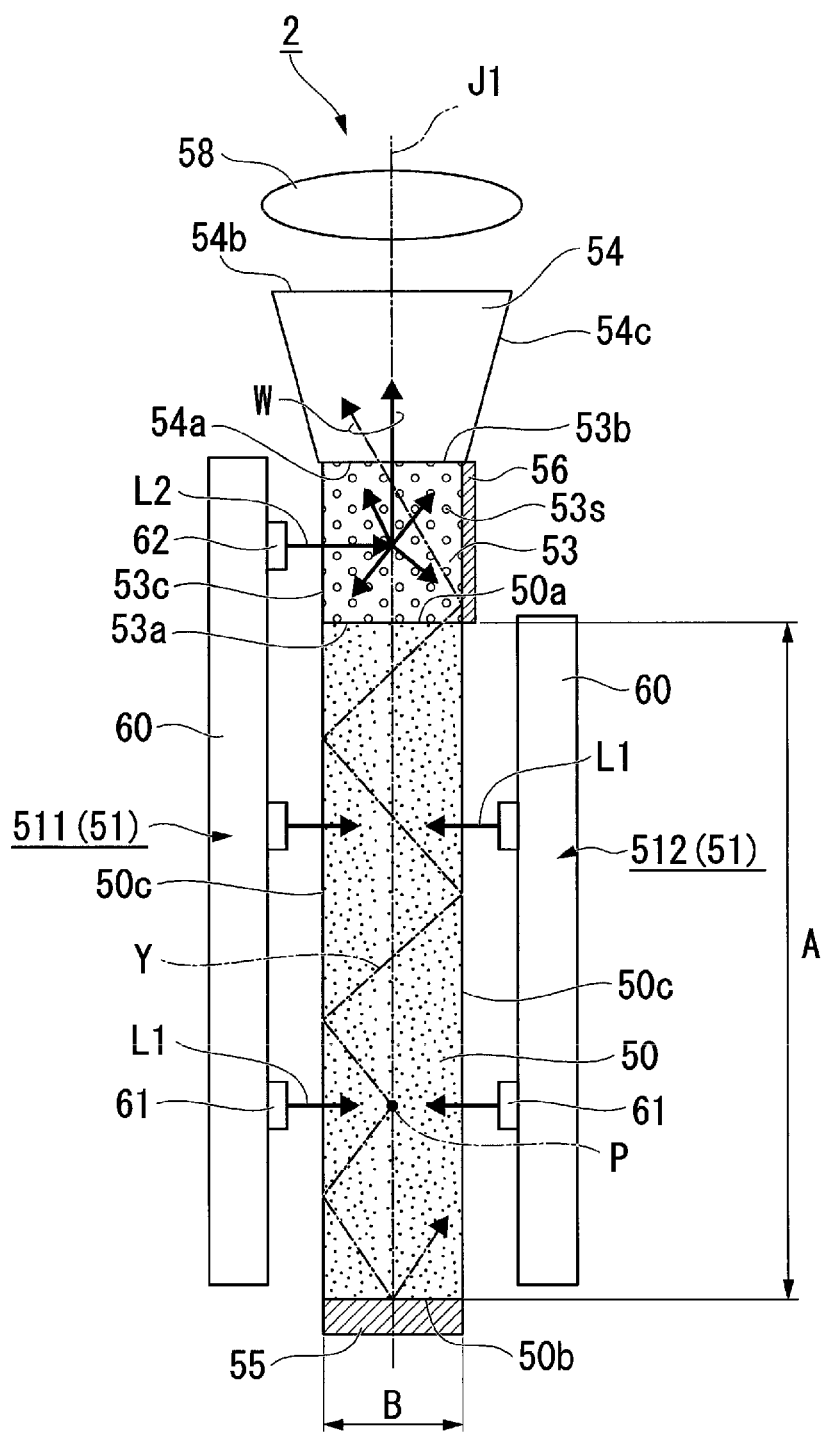
FIG. 2 is a schematic configuration diagram of a light source apparatus according to the first embodiment.

FIG. 2 is a schematic configuration diagram of the light source apparatus 2.

The light source apparatus 2 includes a wavelength conversion rod 50 (wavelength converter), a light combiner 53, a light source 51, an angle converter 54, a mirror 55 (reflector), a reflection film 56, and a collimator lens 58, as shown in FIG. 2.

The wavelength conversion rod 50 has a quadrangular columnar shape and has a first end surface 50a and a second end surface 50b, which face each other, and four side surfaces 50c, which interest the first end surface 50a and the second end surface 50b. The wavelength conversion rod 50 includes at least a phosphor and converts part of light outputted from the light source 51 into fluorescence Y having a wavelength band different from the wavelength band of the light.

In the following description, out of the light outputted from the light source 51, part of the light enters the wavelength conversion rod 50 and is called first light L1, and another part of the light enters the light combiner 53 and is called second light L2 for ease of the description. An axis passing through the center of the first end surface 50a and the center of the second end surface 50b of the wavelength conversion rod 50 is defined as an optical axis J1 of the light source apparatus 2. The first light L1 enters the wavelength conversion rod 50 via the side surfaces 50c, and the fluorescence Y exits out of the wavelength conversion rod 50 via the first end surface 50a.

The dimension A of the wavelength conversion rod 50 in the direction of a normal to the first end surface 50a is greater than the dimension B of the wavelength conversion rod 50 in the direction of a normal to any of the side surfaces 50c. For example, the dimension A is greater than the dimension B by a factor of about ten to several dozens. The wavelength conversion rod 50 does not necessarily have a quadrangular columnar shape and may have a triangular columnar shape or any other polygonal columnar shape. The wavelength conversion rod 50 may still instead have a cylindrical shape. In the case where the wavelength conversion rod 50 has a cylindrical shape, the wavelength conversion rod 50 has a first end surface and a second end surface that face each other and one side surface that interests the first and second end surfaces.

The wavelength conversion rod 50 contains a ceramic phosphor (polycrystal phosphor) that converts the first light L1 into the fluorescence Y in terms of wavelength. The wavelength band of the fluorescence Y is, for example, a yellow wavelength band ranging from 490 to 750 nm. The wavelength conversion rod 50 may contain a single-crystal phosphor in place of a polycrystal phosphor. The wavelength conversion rod 50 may instead be made of fluorescent glass. Still instead, the wavelength conversion rod 50 may be made of a glass or resin binder in which a large number of phosphor particles are dispersed.

Specifically, the wavelength conversion rod 50 contains, for example, an yttrium-aluminum-garnet-based (YAG-based) phosphor. Consider YAG:Ce, which contains cerium (Ce) as an activator by way of example, and the wavelength conversion rod 50 can be made, for example, of a material produced by mixing raw material powder containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The light combiner 53 is provided at the light exiting side of the first end surface 50a of the wavelength conversion rod 50. The light combiner 53 combines the second light L2 and the fluorescence Y with each other and outputs the resultant combined light W. The light combiner 53 contains scatterers that scatter the second light L2 and the fluorescence Y. The scatterers can, for example, be a plurality of scatter particles 53s, the refractive index of which is different from the refractive index of a base material made of a translucent material, dispersed in the base material, such as glass.

The light combiner 53 has a quadrangular columnar shape and has a first surface 53a and a second surface 53b, which face each other, and four third surfaces 53c, which interest the first surface 53a and the second surface 53b. The fluorescence Y enters the light combiner 53 via the first surface 53a, the second light L2 enters the light combiner 53 via part of the third surfaces 53c, and the combined light W exits out of the light combiner 53 via the second surface 53b.

The light combiner 53 is so fixed to the wavelength conversion rod 50 via an optical adhesive (not shown) that the first surface 53a of the light combiner 53 faces the first end surface 50a of the wavelength conversion rod. That is, the light combiner 53 and the wavelength conversion rod 50 are in contact with each other via the optical adhesive, and no air gap (air layer) is present between the light combiner 53 and the wavelength conversion rod 50. In a case where an air gap is provided between the light combiner 53 and the wavelength conversion rod 50, out of the fluorescence Y having reached the first end surface 50a of the wavelength conversion rod 50, the fluorescence Y incident on the first end surface 50a at an angle greater than or equal to the critical angle is totally reflected off the first end surface 50a and does not undesirably enter the light combiner 53. In contrast, in the case where no air gap is provided between the light combiner 53 and the wavelength conversion rod 50, the amount of fluorescence Y that does not enter the light combiner 53 can be reduced. It is desirable from this point of view that the refractive index of the light combiner 53 is as close as possible to the refractive index of the wavelength conversion rod 50.

The light combiner 53 is not necessarily fixed to the wavelength conversion rod 50 via an optical adhesive. The light combiner 53 may instead be so fixed to the wavelength conversion rod 50, for example, via an arbitrary support member that they are in direct contact with one another. In either case, it is desirable that no air gap is provided between the light combiner 53 and the wavelength conversion rod 50.

The light source 51 includes a first light source 511 and a second light source 512 and outputs the first light L1 and the second light L2. The first light source 511 is so provided as to face part of the side surfaces 50c of the wavelength conversion rod 50 and part of the third surface 53c of the light combiner 53. The second light source 512 is so provided as to face another part of the side surfaces 50c of the wavelength conversion rod 50. The first light source 511 and the second light source 512 each includes a substrate 60 and a plurality of light emitting diodes (LEDs) 61 and/or 62 provided on one surface of the substrate 60.

Out of the plurality of LEDs 61 and 62, first LEDs 61 are so provided as to face the side surfaces 50c of the wavelength conversion rod 50. Second LEDs 62 are so provided as to face part of the third surface 53c of the light combiner 53. The first LEDs 61 each output the first light L1, the second LEDs 62 each output the second light L2. The first LEDs 61 and the second LEDs 62 are formed of identical LEDs. The wavelength band of the first light L1 and the wavelength band of the second light L2 are therefore the same and are, for example, each a blue wavelength band ranging from 400 to 480 nm. That is, the first light L1 and the second light L2 are each blue light. The wavelength band of the first light L1 and the second light L2 is preferable for blue light as one component of white light and also preferable as excitation light that excites the phosphor in the wavelength conversion rod 50.

The light source 51 may be so provided as to face part of the four side surfaces 50c of the wavelength conversion rod 50 or all the side surfaces 50c. In the configuration described above, the second LEDs 62 are provided only in the first light source 511 and may instead be provided in both the first light source 511 and the second light source 512. The light source 51 may include a light guide, a diffuser, a lens, and other optical members as well as the LEDs 61 and 62 and the substrate 60. The numbers of LEDs 61 and 62 are not limited to specific numbers.

Out of the four third surfaces 53c of the light combiner 53, the reflection film 56, which reflects the second light L2 outputted from the second LEDs 62, is provided on each of the third surfaces 53c excluding the third surfaces 53c facing the second LEDs 62. Leakage of the second light L2 out of the light combiner 53 via the third surfaces 53c can thus be avoided, whereby the efficiency at which the second light L2 is used can be increased. A scatter structure that reflects the second light L2 may be provided in place of the reflection film 56 on the third surfaces excluding the third surfaces 53c facing the second LEDs 62.

The angle converter 54 is provided at the light exiting side of the second surface 53b of the light combiner 53. The angle converter 54 is formed of a tapered rod having a light incident end surface 54a, on which the combined light W is incident, a light exiting end surface 54b, via which the combined light W exits, and side surfaces 54c. The angle converter 54 has a truncated pyramidal shape, with the cross-sectional area thereof perpendicular to the optical axis J1 increasing with distance along the traveling direction of the combined light W, and the area of the light exiting end surface 54b is therefore greater than the area of the light incident end surface 54a. The thus shaped angle converter 54 angularly changes the traveling direction of the combined light W, while the combined light W travels in the angle converter 54, to the direction parallel to the optical axis J1 each time the combined light W is totally reflected off any of the side surfaces 54c. The angle converter 54 thus causes the diffusion angle of the combined light W at the light exiting end surface 54b to be smaller than the diffusion angle of the combined light W at the light incident end surface 54a.

The angle converter 54 is so fixed to the light combiner 53 via an optical adhesive (not shown) that the light incident end surface 54a faces the second surface 53b of the light combiner 53. That is, the angle converter 54 and the light combiner 53 are in contact with each other via the optical adhesive, and no air gap (air layer) is provided between the angle converter 54 and the light combiner 53. The angle converter 54 may instead be so fixed to the light combiner 53, for example, via an arbitrary support member that they are in direct contact with one another. In either case, it is desirable that no air gap is provided between the angle converter 54 and the light combiner 53. Also in this case, it is desirable that the refractive index of the angle converter 54 is as close as possible to the refractive index of the light combiner 53, as in the above-mentioned relationship between the wavelength conversion rod 50 and the light combiner 53.

The angle converter 54 may instead be a compound parabolic concentrator (CPC). In the case where the angle converter 54 is a CPC, the same effect provided in the case where the angle converter 54 is the tapered rod are provided.

The collimator lens 58 is provided at the light exiting side of the light exiting end surface 54b of the angle converter 54. The collimator lens 58 parallelizes the combined light W having exited out of the angle converter 54. That is, the collimator lens 58 further increases the parallelism of the combined light W, the angle distribution of which has been converted by the angle converter 54. The collimator lens 58 is formed of a convex lens. In a case where only the angle converter 54 provides sufficient parallelism of the combined light W, the collimator lens 58 may not be provided.

The mirror 55 is provided on the second end surface 50b of the wavelength conversion rod 50. The mirror 55 reflects the fluorescence Y and the first light L1 having been guided in the wavelength conversion rod 50 and having reached the second end surface 50b. The mirror 55 is formed of a metal film or a dielectric multilayer film formed on the second end surface 50b of the wavelength conversion rod 50.

The behavior of the light in the light source apparatus 2 having the configuration described above will be described below.

When the first light L1 outputted from the first LEDs 61 enters the wavelength conversion rod 50 via the side surfaces 50c, the first light L1 excites the phosphor contained in the wavelength conversion rod 50, and the fluorescence Y is emitted from an arbitrary light emission point P. The fluorescence Y travels omnidirectionally from the arbitrary light emission point P, and the fluorescence Y traveling toward the side surfaces 50c is totally reflected off the side surfaces 50c and travels toward the first end surface 50a or the second end surface 50b while being repeatedly totally reflected. The fluorescence Y traveling toward the first end surface 50a enters the light combiner 53. On the other hand, the fluorescence Y traveling toward the second end surface 50b is reflected off the mirror 55 and then travels toward the first end surface 50a.

Out of the first light L1 having entered the wavelength conversion rod 50, the first light L1 that has not been used to excite the phosphor is reflected off the mirror 55 provided on the second end surface 50b and is therefore used again as the excitation light when the reflected first light L1 propagates in the wavelength conversion rod 50 again.

The second light L2 outputted from the second LEDs 62 and the fluorescence Y having exited out of the wavelength conversion rod 50 enter the light combiner 53. In the light combiner 53, the second light L2 and the fluorescence Y are isotropically and omnidirectionally scattered by the plurality of scatter particles 53s. The blue second light L2 and the yellow fluorescence Y are thus combined with each other into the white combined light W. Out of the combined light W, the combined light incident on the third surfaces 53c at angles greater than or equal to the critical angle is totally reflected off the third surfaces 53c and travels toward the first surface 53a and the second surface 53b. The combined light W incident on the second surface 53b at angles smaller than the critical angle exits out of the light combiner 53 and enters the angle converter 54.

The combined light W incident on the second surface 53b at angles greater than or equal to the critical angle is temporality totally reflected off the second surface 53b, and the totally reflected combined light W is scattered by the scatter particles 53s again, so that part of the combined light W exits via the second surface 53b. The combined light W traveling toward the first surface 53a is also scattered by the scatter particles 53s again, so that part of the combined light W exits via the second surface 53b. The combined light W having exited out of the light combiner 53 is parallelized by the angle converter 54 and the collimator lens 58 and then outputted from the light source apparatus 2. The combined light W (illumination light WL) outputted from the light source apparatus 2 travels toward the optical integration system 31, as shown in FIG. 1.

In the light source apparatus 2 according to the present embodiment, the light source 51, which outputs the first light L1 and the second light L2, is so disposed as to face the side surfaces 50c of the wavelength conversion rod 50 and part of the third surfaces 53c of the light combiner 53, and the light combiner 53, which combines the second light L2 and the fluorescence Y with each other, is bonded to and integrated with the wavelength conversion rod 50. A compact light source apparatus 2 capable of outputting white light can thus be provided.

The light outputted from an LED typically has a diffusion angle greater than that of the light outputted from a semiconductor laser. A light source using an LED therefore has etendue, which is determined by the product of the light emission area of the light source and the solid angle of the light from the light source, greater than the etendue of a light source using a semiconductor laser. An increase in the etendue of a light source apparatus increases the amount of light that an optical system on the downstream of the light source apparatus cannot capture, resulting in a decrease in the light use efficiency in a projector. It is therefore desirable that a light source apparatus for a projector has smallest possible etendue.

From this point of view, in the present embodiment, the light source 51 includes the LEDs 61 and 62, and the first light L1 outputted from the LEDs 61 and 62 and having a large diffusion angle enters the wavelength conversion rod 50 via the side surfaces 50c each having a large area. On the other hand, the fluorescence Y generated in the wavelength conversion rod 50 exits via the first end surface 50a having an area sufficiently smaller than the area of each of the side surfaces 50c. Since the substantial light emission area of the wavelength conversion rod 50 corresponds to the area of the first end surface 50a, the configuration in the present embodiment is equivalent to reduction in the light emission area. As described above, according to the present embodiment, a light source apparatus 2 having small etendue can be achieved, and use of the light source apparatus 2 in the project 1 allows an increase in the light use efficiency.

Further, in the present embodiment, since the wavelength band of the first light L1 is the same as the wavelength band of the second light L2, and the first LEDs 61 and the second LEDs 62 are formed of identical LEDs, the light source 51 can be formed by providing only one type of LED. The cost of the light source apparatus 2 can therefore be reduced.

In the present embodiment, the wavelength band of the second light L2 is a blue wavelength band, and the wavelength band of the fluorescence Y is a yellow wavelength band. That is, the yellow fluorescence Y exits out of the wavelength conversion rod 50, and the blue second light L2 is outputted from the second LEDs 62. The fluorescence Y and the second light L2 are then combined with each other into white light as the combined light W. Adjusting the balance between the amount of fluorescence Y and the amount of second light L2 can therefore adjust the white balance of the combined light W.

As a specific method for adjusting the white balance, for example, a sensor that detects the amount of fluorescence Y and a sensor that detects the amount of second light L2 may be provided in the light source apparatus 2, and electric power supplied to each of the first LEDs 61 and the second LEDs 62 may be adjusted in accordance with a deviation from a standard value of each of the amounts of light detected with the sensors. The white balance may instead be adjusted in the design stage of the light source apparatus 2, for example, by creating a difference in dimension between the wavelength conversion rod 50 and the light combiner 53 or in number between the first LEDs 61 and the second LEDs 62.

In the light source apparatus 2 according to the present embodiment, the angle converter 54, which is provided at the light exiting side of the light combiner 53, can parallelize the combined light W having exited out of the light combiner 53. Further, the collimator lens 58, which is provided at the light exiting side of the angle converter 54, can further increase the parallelism of the combined light W. The light use efficiency in an optical system on the downstream of the light source apparatus 2 can thus be increased.

In the light source apparatus 2 according to the present embodiment, the mirror 55, which is provided on the second end surface 50b of the wavelength conversion rod 50, can prevent the fluorescence Y generated in the wavelength conversion rod 50 from exiting via the second end surface 50b. The mirror 55 further prevents the first light L1 that has not been used to excite the phosphor from leaking out of the wavelength conversion rod 50 via the second end surface 50b. The efficiency at which the fluorescence Y and the first light L1 are used can thus be increased.

The projector 1 according to the present embodiment, which includes the light source apparatus 2 described above, is reduced in size and excels in the light use efficiency.

Second Embodiment

A second embodiment of the present disclosure will be described below with reference to FIG. 3.

The basic configuration of a light source apparatus according to the second embodiment is the same as that according to the first embodiment, but the second embodiment differs from the first embodiment in terms of the configuration of the light combiner. The overall light source apparatus will not therefore be described.

Figure 3:
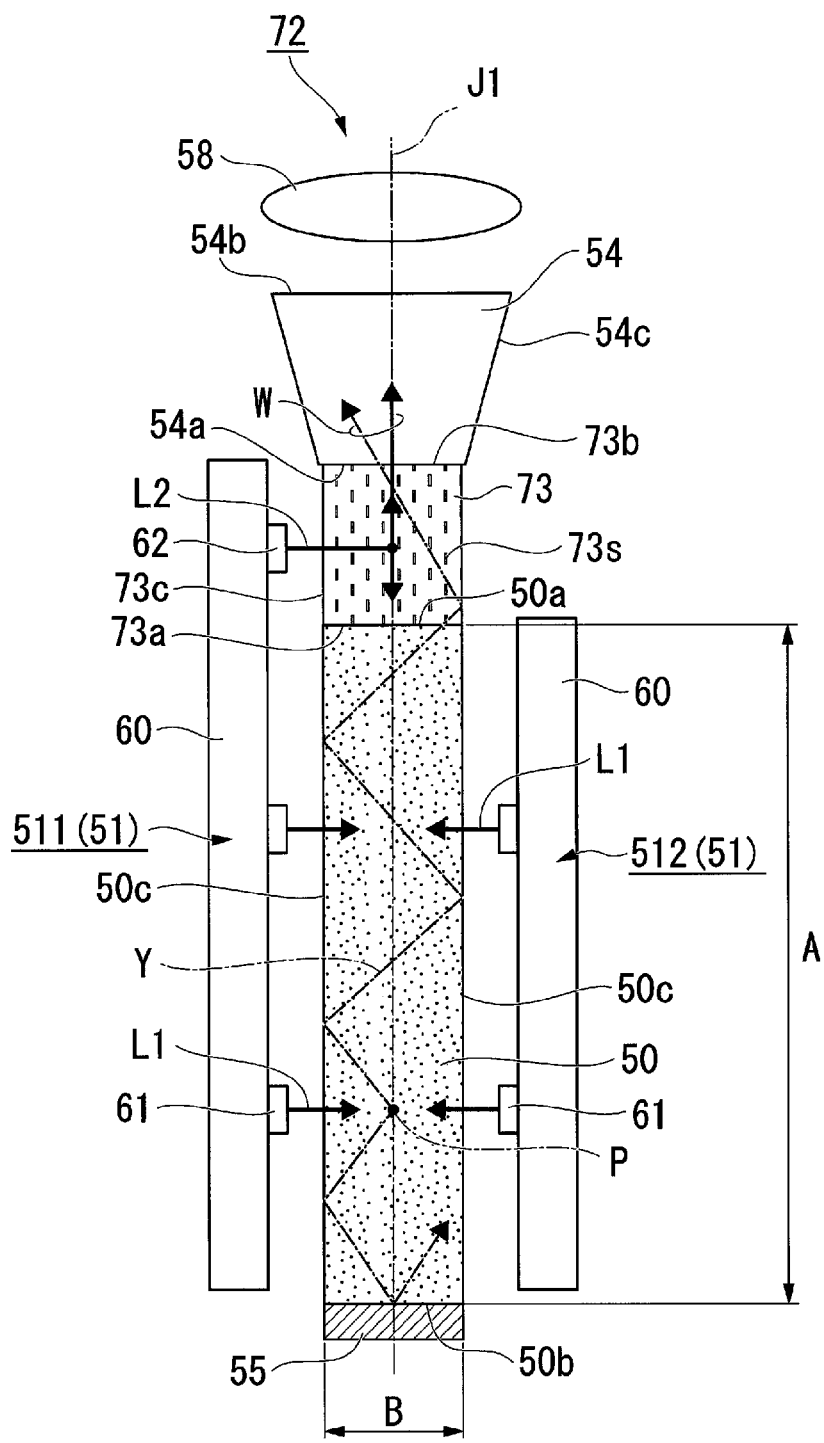
FIG. 3 is a schematic configuration diagram of a light source apparatus according to a second embodiment.

FIG. 3 is a schematic configuration diagram of the light source apparatus.

In FIG. 3, components common to those in FIG. 2 have the same reference characters and will not be described.

Alight source apparatus 72 includes the wavelength conversion rod 50 (wavelength converter), alight combiner 73, the light source 51, the angle converter 54, the mirror 55 (reflector), and the collimator lens 58, as shown in FIG. 3.

In the light source apparatus 72 according to the present embodiment, the light combiner 73 has a first surface 73a and a second surface 73b, which face each other, and four third surfaces 73c, which interest the first surface 73a and the second surface 73b.

The light combiner 73 contains scatterers that scatter the second light L2 and the fluorescence Y. In the present embodiment, the scatterers have scattering anisotropy characterized in that the scatterers scatter light in the direction that intersects the first surface 73a and the second surface 73b (direction parallel to optical axis J1) by a greater amount than in the direction parallel to the first surface 73a and the second surface 73b (direction perpendicular to optical axis J1). The scatterers can, for example, be a plurality of needle-shaped scatter particles 73s, the refractive index of which is different from the refractive index of a base material made of a translucent material, oriented in the direction that intersects the first surface 73a and the second surface 73b.

The other configurations of the light source apparatus 72 are the same as those in the first embodiment.

The second embodiment also provides the same effects as those provided by the first embodiment, for example, a compact light source apparatus 72 capable of outputting white light can be achieved, and a light source apparatus 72 having small etendue can be achieved.

In the light source apparatus 72 according to the present embodiment, in particular, the scatterers in the light combiner 73 have scattering anisotropy characterized in that the scatterers scatter light in the direction parallel to the optical axis J1 by a greater amount than in the direction perpendicular to the optical axis J1. The second light L2 incident via the third surfaces 73c of the light combiner 73 is therefore scattered more strongly than the fluorescence Y incident via the first surface 73a of the light combiner 73. The combined light W formed of the second light L2 and the fluorescence Y is therefore likely to travel toward the second surface 73b of the light combiner 73. Therefore, in the configuration in the present embodiment, the reflection film provided on the third surfaces 73c of the light combiner 73 can be unnecessary in some cases. As a result, the configuration in the present embodiment allows an increase in the efficiency at which the combined light W is extracted.

Third Embodiment

A third embodiment of the present disclosure will be described below with reference to FIG. 4.

The basic configuration of a light source apparatus according to the third embodiment is the same as that according to the first embodiment, but the third embodiment differs from the first embodiment in terms of the configuration of the light combiner. The overall configuration of the light source apparatus will not therefore be described.

Figure 4:
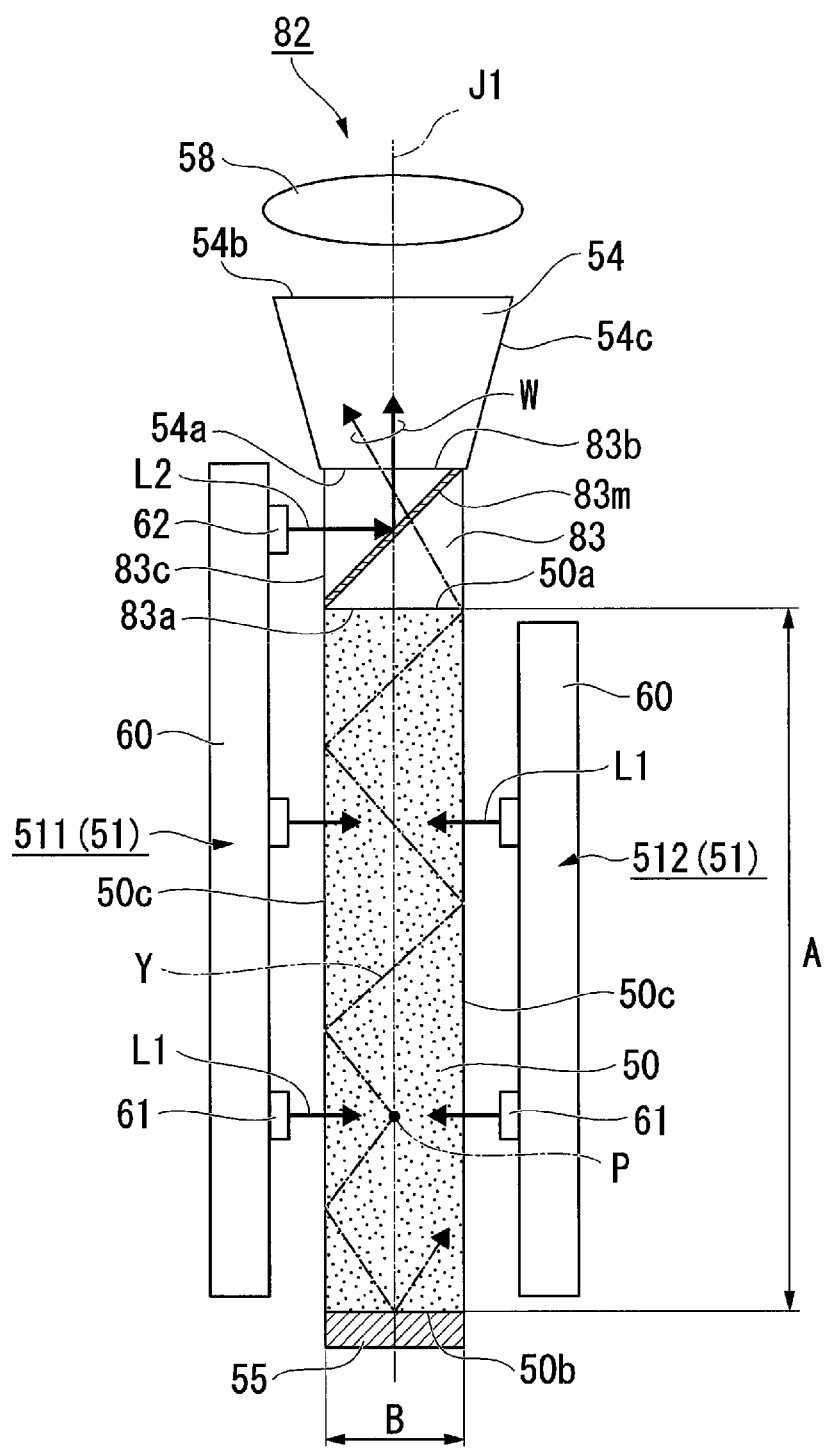
FIG. 4 is a schematic configuration diagram of a light source apparatus according to a third embodiment.

FIG. 4 is a schematic configuration diagram of the light source apparatus 82.

In FIG. 4, components common to those in FIG. 2 have the same reference characters and will not be described.

The light source apparatus 82 includes the wavelength conversion rod 50 (wavelength converter), a light combiner 83, the light source 51, the angle converter 54, the mirror 55 (reflector), and the collimator lens 58, as shown in FIG. 4.

In the light source apparatus 82 according to the present embodiment, the light combiner 83 has a first surface 83a and a second surface 83b, which face each other, and four third surfaces 83c, which interest the first surface 83a and the second surface 83b.

The light combiner 83 includes a dichroic prism that transmits the fluorescence Y and reflects the second light L2. The dichroic prism includes a dichroic mirror 83m, which transmits light having a yellow wavelength band and reflects light having a blue wavelength band. The dichroic mirror 83m is so disposed as to incline by 45° with respect to the optical axis J1.

The other configurations of the light source apparatus 82 are the same as those in the first embodiment.

The third embodiment also provides the same effects as those provided by the first embodiment, for example, a compact light source apparatus 82 capable of outputting white light can be achieved, and a light source apparatus 82 having small etendue can be achieved.

In the light source apparatus 82 according to the present embodiment, in particular, the fluorescence Y having exited out of the wavelength conversion rod 50 passes through the dichroic mirror 83m, and the second light L2 outputted from the second LEDs 62 is reflected off the dichroic mirror 83m, so that the fluorescence Y and the second light L2 are combined with each other. The combined light W is then guided to the angle converter 54 via the second surface 83b of the light combiner 83.

Fourth Embodiment

A fourth embodiment of the present disclosure will be described below with reference to FIG. 5.

The first embodiment has been described with reference to a liquid crystal projector, and the fourth embodiment will be described with reference to a projector including a micromirror-type light modulator.

Figure 5:
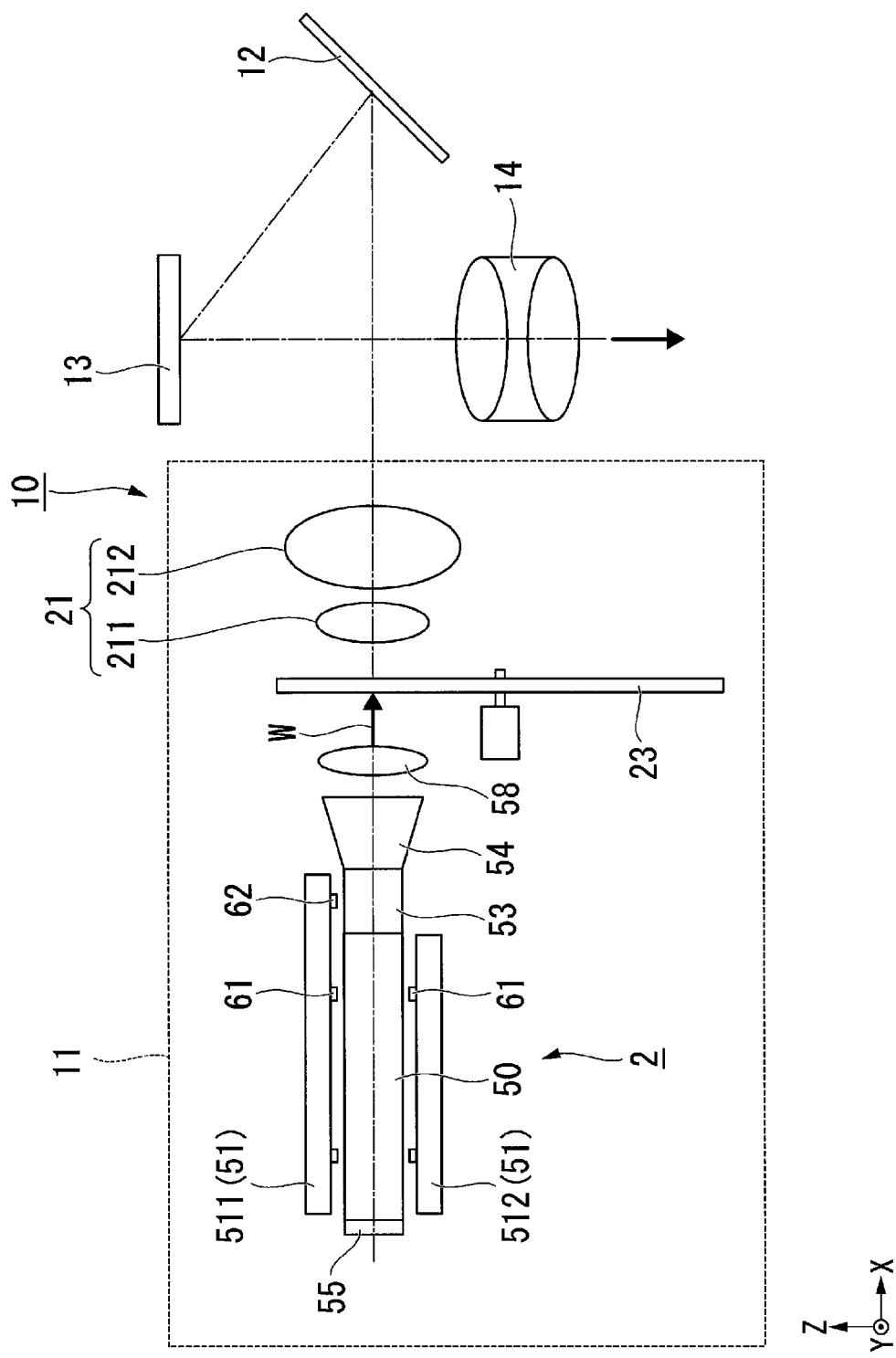
FIG. 5 is a schematic configuration diagram of a projector according to a fourth embodiment.

A projector 10 according to the fourth embodiment includes an illuminator 11, a light guide system 12, a micromirror-type light modulator 13, and a projection optical apparatus 14, as shown in FIG. 5. The illuminator 11 includes the light source apparatus 2, a color wheel 23, and a pickup system 21.

In the fourth embodiment, the light source apparatus 2 is the light source apparatus 2 according to the first embodiment. The light source apparatus 2 may instead be the light source apparatus 72 according to the second embodiment or the light source apparatus 82 according to the third embodiment. The light source apparatus 2 will therefore not be described in the fourth embodiment.

The color wheel 23 has a configuration in which three color filters, red, green, and blue filters, are provided on a rotatable substrate along the circumferential direction around the axis of rotation. The combined light W outputted from the light source apparatus 2 passes through the color wheel 23, which rotates at high speed, and the red light, the green light, and the blue light exit out of the color wheel 23 in a time division manner.

In the present embodiment, in which the configuration of the light source apparatus 2 is the same as that in the first embodiment, the red light, the green light, and the blue light may be generated in a time division manner by alternately turning on the first LEDs 61 and the second LEDs 62 in a time division manner, separating the yellow light outputted from the light source apparatus 2 when the first LEDs 61 are turned on into the red light and the green light in a time division manner by the color wheel 23, and outputting the blue light outputted from the light source apparatus 2 when the second LEDs 62 are turned on for a period different from the period for which the red light and the green light are outputted.

The red light, the green light, and the blue light may still instead be generated in a time division manner by turning on the first LEDs 61 and the second LEDs 62 at the same time and separating the white light outputted from the light source apparatus 2 through the color wheel 23 in a time division manner.

In the case where the former method is employed, the yellow light and the blue light do not enter the light combiner 53 of the light source apparatus 2 at the same time. Even in this case, the light combiner 53 outputs the yellow light and the blue light in the same direction that are switched from one to the other at a speed that does not allow human eyes to recognize the switching and therefore functions as an element that combines the yellow light and the blue light with each other.

The pickup system 21 is formed of a first convex lens 211 and a second convex lens 212. The red light, the green light, and the blue light having exited out of the color wheel are transmitted by the pickup system 21 to the light guide system 12.

The light guide system 12 is formed of a reflection mirror. The light guide system 12 reflects the red light, the green light, and the blue light outputted from the light source apparatus 2 and causes them to be incident on the light modulator 13 in a time division manner.

The micromirror-type light modulators 13 is, for example, a digital micromirror device (DMD). A DMD has a configuration in which a plurality of micromirrors are arranged in a matrix. The DMD switches the inclination direction of the plurality of micromirrors from one to another at high speed to switch the direction in which the incident light is reflected off the micromirrors between the direction in which the reflected light enters the projection optical apparatus 14 and the direction in which the reflected light does not enter the projection optical apparatus 14. The light modulator 13 thus sequentially modulates the red light, the green light, and the blue light outputted from the light source apparatus 2 to produce a red image, a green image, and a blue image.

The projection optical apparatus 14 projects the red image, the green image, and the blue image on a screen. The projection optical apparatus 14 is formed, for example, of a plurality of projection lenses.

The projector 10 according to the present embodiment, which includes the light source apparatus 2 according to the first embodiment, is reduced in size and excels in the light use efficiency.

The technical range of the present disclosure is not limited to the embodiments described above, and a variety of changes can be made thereto to the extent that the changes do not depart from the substance of the present disclosure.

For example, in the light source apparatus according to each of the first and second embodiments described above, the light combiner is configured to scatter the second light and the fluorescence and may instead be configured not to scatter light. Even a light combiner formed of a translucent member that does not scatter light can produce combined light by mixing the second light and the fluorescence when they are guided through the translucent member.

A dichroic mirror that transmits the fluorescence (yellow light) generated in the wavelength conversion rod and reflects the second light (blue light) outputted from the first LEDs may be provided between the first end surface of the wavelength conversion rod and the first surface of the light combiner. The efficiency at which the fluorescence and the second light are used can thus be increased.

A dichroic mirror that transmits the first light (blue light) outputted from the first LEDs and reflects he fluorescence (yellow light) generated in the wavelength conversion rod may be provided on each of the side surfaces of the wavelength conversion rod. The efficiency at which the first light and the fluorescence are used can thus be increased, whereby the wavelength conversion efficiency can be increased.

The above embodiments have been described with reference to the case where the wavelength conversion rod contains a phosphor that emits yellow fluorescence. The wavelength conversion rod may instead contain two types of phosphor formed of a phosphor that emits green fluorescence and a phosphor that emits red fluorescence. In this case, the two types of phosphor may be uniformly mixed with each other and contained in the wavelength conversion rod or may be individually contained in separate regions.

The above embodiments have been described with reference to the case where the light source apparatus outputs white light, and the present disclosure is also applicable to a light source apparatus that outputs color light other than white light. For example, the light source apparatus may include a wavelength conversion rod that outputs green fluorescence and second LEDs that output blue light and may output cyan light. Even in this case, the present disclosure can provide a compact light source apparatus capable of outputting cyan light. Further, combining the light source apparatus with a separately provided red light source allows generation of white light.

The above embodiments have been described with reference to the case where the wavelength band of the first light is the same as the wavelength band of the second light, and the wavelength band of the first light may differ from the wavelength band of the second light. For example, the wavelength bands of the first light and the second light may be individually optimized, for example, the wavelength band of the first light may be so set as to be optimum for the excitation of the phosphor, and the wavelength band of the second light may be so set as to be optimum for the generation of the white light.

The shape, the number, the arrangement, the material, and other specific configurations of the components that form the light source apparatuses are not limited to those in the embodiments described above and can be changed as appropriate.

The above first embodiment has been described with reference to the case where the present disclosure is applied to a transmissive liquid crystal projector, and the present disclosure is also applicable to a reflective liquid crystal projector. The term "transmissive" used herein means that a liquid crystal light valve, including a liquid crystal panel or any other component, transmits light. The term "reflective" means that the liquid crystal light valve reflects light.

The above first embodiment has been described with reference to a projector including three liquid crystal panels. The present disclosure is also applicable to a projector using only one liquid crystal light valve and a projector using four or more liquid crystal light valves.

The above embodiments have been described with reference to the case where the light source apparatus according to each of the embodiments of the present disclosure is incorporated in a projector, but not necessarily. The light source apparatus according to each of the embodiments of the present disclosure may also be used as a lighting apparatus, a headlight of an automobile, and other components.

What is claimed is:

1. A light source apparatus comprising:
a light source that outputs first light and second light;
a wavelength converter that at least contains a phosphor and converts the first light outputted from the light source into fluorescence having a wavelength band different from a wavelength band of the first light; and
a light combiner that combines the second light outputted from the light source with the fluorescence having exited out of the wavelength converter and outputs a resultant combined light, wherein the light combiner includes a dichroic prism that transmits the fluorescence and reflects the second light,
wherein the wavelength converter has a first end surface and a second end surface that face each other and a side surface that intersects the first and second end surfaces, the light combiner has a first surface and a second surface that face each other and a third surface that intersects the first and second surfaces,
the first end surface of the wavelength converter faces the first surface of the light combiner,
the first light enters the wavelength converter via the side surface, and the fluorescence exits out of the wavelength converter via the first end surface, and
the fluorescence enters the light combiner via the first surface, the second light enters the light combiner via the third surface, and the combined light exits out of the light combiner via the second surface.

2. The light source apparatus according to claim 1, wherein the wavelength band of the first light is the same as a wavelength band of the second light.

3. The light source apparatus according to claim 1, further comprising a reflector that is provided at the second end surface of the wavelength converter and reflects at least the fluorescence.

4. The light source apparatus according to claim 1, further comprising an angle converter that is provided at a light exiting side of the light combiner, has a light incident end surface and a light exiting end surface, and causes a diffusion angle of the combined light at the light exiting end surface to be smaller than the diffusion angle of the combined light at the light incident end surface.

5. The light source apparatus according to claim 1, wherein a wavelength band of the second light is a blue wavelength band, and the wavelength band of the fluorescence is a yellow wavelength band.

6. A projector comprising:
the light source apparatus according to claim 1;
a light modulator that modulates light from the light source apparatus in accordance with image information; and a projection optical apparatus that projects the light modulated by the light modulator.

7. The light source apparatus according to claim 1, wherein the phosphor in the wavelength converter is a ceramic phosphor that converts the wavelength band of the first light into the wavelength band of the fluorescence.

8. The light source apparatus according to claim 1, wherein the wavelength converter is fixed to the light combiner via a support member.

9. The light source apparatus according to claim 1, wherein the wavelength converter comprises a glass or resin binder in which phosphor particles are dispersed.

10. The light source apparatus according to claim 1, wherein the wavelength converter and the light combiner are in contact via an optical adhesive with no air gap between the wavelength converter and the light combiner.

\* \* \* \* \*